(12) United States Patent
De Boissieu et al.

(10) Patent No.: US 9,080,854 B2
(45) Date of Patent: Jul. 14, 2015

(54) TACTILE SURFACE TEXTURE CHARACTERISATION METHOD

(75) Inventors: Florian De Boissieu, Echirolles (FR); Christelle Godin, Brignoud (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 867 days.

(21) Appl. No.: 13/319,260

(22) PCT Filed: May 6, 2010

(86) PCT No.: PCT/EP2010/056195
§ 371 (c)(1),
(2), (4) Date: Jan. 18, 2012

(87) PCT Pub. No.: WO2010/130631
PCT Pub. Date: Nov. 18, 2010

(65) Prior Publication Data
US 2012/0109541 A1      May 3, 2012

(30) Foreign Application Priority Data

May 11, 2009 (FR) ...................................... 09 53107

(51) Int. Cl.
*G01B 5/28* (2006.01)

(52) U.S. Cl.
CPC ........................................ *G01B 5/28* (2013.01)

(58) Field of Classification Search
CPC .............. G01B 5/28; G01B 7/25; G01B 7/34; G01B 7/345; G01L 5/226; G01L 5/228; G01N 19/02; G01N 19/08
USPC ........... 702/41, 42; 73/105, 862.043, 862.044
See application file for complete search history.

(56) References Cited

U.S. PATENT DOCUMENTS

2002/0133317 A1* 9/2002 Kadtke et al. ................. 702/189
2006/0169023 A1* 8/2006 David ................................ 73/9

FOREIGN PATENT DOCUMENTS

WO   WO 2005/085805 A1   9/2005
WO   WO 2007/077175 A1   7/2007

OTHER PUBLICATIONS

Fox, Charles W. et al. "Contact Type Dependency of Texture Classification in a Whiskered Mobile Robot", Mar. 18, 2009, Autonomous Robots, vol. 26, No. 4, pp. 223-239.*
U.S. Appl. No. 13/255,806, filed Sep. 9, 2011, De Boissieu et al.
(Continued)

*Primary Examiner* — Manuel L Barbee
(74) *Attorney, Agent, or Firm* — Oblon, McClelland, Maier & Neustadt, L.L.P.

(57) ABSTRACT

A tactile surface texture method including: measuring at least one force perceived by a force sensor during a relative movement of the sensor with respect to a surface to be characterized; calculating one or more time and/or frequency parameters of an output signal transmitted by the sensor representative of the previously measured force; determining a value of a tactile descriptor of multiple tactile descriptors through application of a continuous transfer function to the previously calculated parameters, the transfer function being previously determined by regression from a learning database associating, for each descriptor, plural values of the tactile descriptor with plural values of one or more time and/or frequency parameters calculated from measurements made by the force sensor on multiple test surfaces representative of values of the tactile descriptor in question.

12 Claims, 2 Drawing Sheets

(56) References Cited

OTHER PUBLICATIONS

Figure 1:
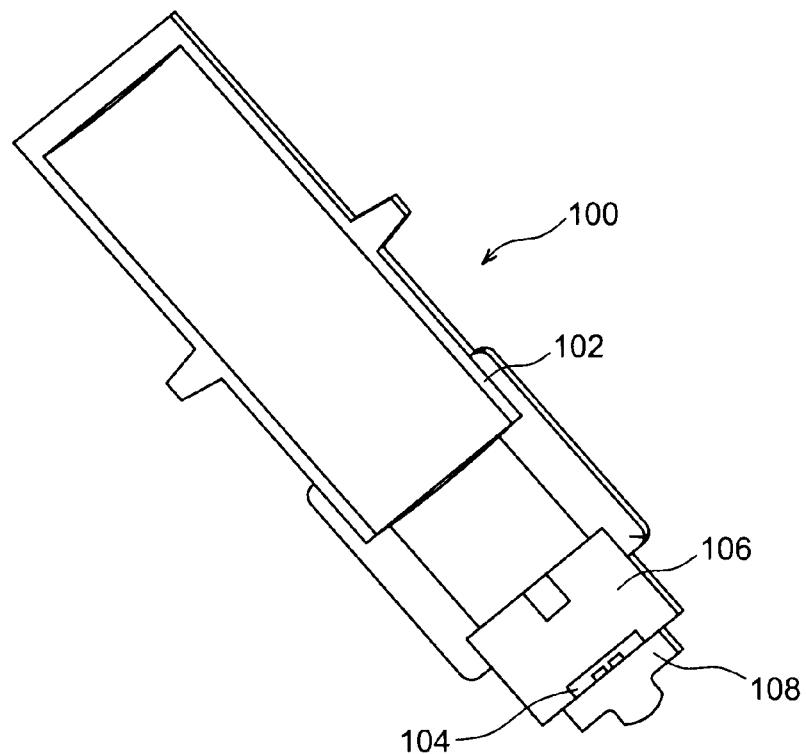

French Preliminary Search Report issued Oct. 20, 2009, in Patent Application No. 0953107, filed May 11, 2009.
Charles W. Fox, et al., "Contact type dependency of texture classification in a whiskered mobile robot", Autonomous Robots, vol. 26, No. 4, XP019670017, Mar. 18, 2009, pp. 223-239.
Lucia Beccai, et al., "Development and Experimental Analysis of a Soft Compliant Tactile Microsensor for Anthropomorphic Artificial Hand", IEEE/Asme Transactions on Mechatronics, vol. 13, No. 2, XP011207610, Apr. 1, 2008, pp. 158-168.
F. De Boissieu, et al., "Texture exploration with an artificial finger", Materials & Sensations 2008, Abstract, XP009124203, Oct. 22, 2008, p. 12.
Kunnyun Kim, et al., "A Silicon-based flexible tactile sensor for ubiquitous robot companion applications", Journal of Physics: Conference Series, Institute of Physics Publishing, vol. 34, No. 1, XP020109636, Apr. 1, 2006, pp. 399-403.
Lucia Beccai, et al., "Design and fabrication of a hybrid silicon three-axial force sensor for biomechanical applications", Sensors and Actuators A, vol. 120, No. 2, XP025325091, May 17, 2005, pp. 370-382.
Bart J. Kane, et al., "A Traction Sress Sensor Array for Use in High-Resolution Robotic Tactile Imaging", Journal of Microelectromechanical Systems, vol. 9, No. 4, XP011034591, Dec. 1, 2000, pp. 425-434.
Mark Hollins, et al., "The Coding of Roughness", Canadian Journal of Experimental Psychology, American Psychological Association, vol. 61, No. 3, XP009124199, Sep. 1, 2007, pp. 184-195.
Koh Hosoda, et al., "Anthropomorphic robotic soft fingertip with randomly distributed receptors", Robotics and Autonomous Systems, vol. 54, 2006, pp. 104-109.
Robert D. Howe, et al., "Dynamic Tactile Sensing: Perception of Fine Surface Features with Stress Rate Sensing", IEEE Transactions on Robotics and Automation, vol. 9, No. 2, Apr. 1993, pp. 140-151.
Steve R. Gunn, "Support Vector Machines for Classification and Regression" University of Southhampton, May 10, 1998, 57 pgs.
Takashi Maeno, et al., "Geometry Design of an Elastic Finger-Shaped Sensor for Estimating Friction Coefficient by Pressing an Object", Proceedings IEEE International Conference on Robotics and Automation, 2003, pp. 1533-1538.
R. Montgomery, et al., "Measuring physical and visual material properties to determine their perceived degree of naturalness", Materials & Sensations 2008, Oct. 22-24, 2008, pp. 1-4.
Yuka Mukaibo, et al., "Development of a Texture Sensor Emulating the Tissue Structure and Perceptual Mechanism of Human Fingers" Proceedings of the 2005 IEEE International Conference on Robotics and Automation, Apr. 2005, pp. 2576-2581.
Mami Tanaka, et al., "Active haptic sensation for monitoring skin conditions", Journal of Materials Processing Technology, vol. 161, 2005, pp. 199-203.
Stefan Thumfart, et al., "Feature based prediction of the perceived and aesthetic properties of visual textures", Materials & Sensations 2008, Oct. 22-24, 2008, pp. 1-4.
Gábor Vásárhelyi, et al., "Characterization of an Integrable Single-Crystalline 3-D Tactile Sensor", IEEE Sensors Journal, vol. 6, No. 4, Aug. 2006, pp. 928-934.
C.T. Yao, et al., "A Novel Three-Dimensional Microstructure Fabrication Technique for a Triaxial Tactile Sensor Array", Proceedings of the IEEE Micro-Robotics and Teleoperaters Workshop, 1987, 6 pgs.
U.S. Appl. No. 13/898,644, May 21, 2013, Godin, et al.

\* cited by examiner

TACTILE SURFACE TEXTURE CHARACTERISATION METHOD

TECHNICAL FIELD

The invention concerns a tactile surface texture characterisation method enabling the tactile characteristics to be defined, by means of mechanical descriptors or tactile descriptors, of a surface, whether or not flat. The invention can apply to all fields relating to the manufacture of products the tactile characteristics of which are substantial. The invention can apply, for example, to the fields of the paper production industry, textiles, vehicle manufacture, food production, or indeed the cosmetics industry, in order to:
- estimate the sensations perceived by the consumer for a new product,
- verify the tactile properties of a product after manufacture (quality control),
- assess the variation of the tactile perceptions according to the different compositions or methods of manufacture of the product.

The invention can also apply to the field of robotics, in order to give a robot a sense of touch, or again biomimetics, for example to manufacture active prostheses, or again to undertake remote medical operations in order to make the sensations tactile for the surgeon during a remote operation.

STATE OF THE PRIOR ART

The document "Texture Exploration with an Artificial Finger" by F. de Boissieu et al., Materials & Sensations 2008, Pau, France, 22 to 24 Oct. 2008, describes the discrimination of different textures through the use of a triaxial force sensor. The texture of a surface is analysed by calculating the Euclidean distances between the spectrum measured for the analysed texture and the average spectra of various test surfaces. It is then considered that the analysed surface belongs to the same category as the test surface the average spectrum of which has the smallest Euclidean distance to the average spectrum of the analysed surface.

This method allows fine classification of textures in arbitrary classes. However, this method does not enable the tactile characteristics, such as values of softness or tackiness, of a given sample, to be characterised quantitatively. In addition, this method provides no relationship (proximity of characteristics) between the different classes.

ACCOUNT OF THE INVENTION

One aim of the present invention is to offer a tactile surface texture characterisation method enabling an estimate to be made of the fine mechanical characteristics of surface textures, which does not have the disadvantages of the prior art. One aim of the present invention is also to offer a tactile surface texture characterisation method which undertakes a surface analysis according to human tactile criteria through values of one or more tactile descriptors, or mechanical descriptors.

To accomplish this, the present invention offers a tactile surface texture characterisation method including at least the following steps:
- measuring at least one force perceived by a force sensor during a relative movement of the said sensor with respect to a surface to be characterised,
- calculating one or more time and/or frequency parameters of an output signal transmitted by the said sensor representative of the previously measured force,
- determining a value of a tactile descriptor of multiple tactile descriptors through application of a continuous transfer function to the previously calculated parameters, where the transfer function is previously determined by regression from a learning database associating, for each descriptor, several values of the tactile descriptor in question with several values of one or more time and/or frequency parameters calculated from measurements made by the force sensor on multiple test surfaces representative of values of the tactile descriptor in question.

A tactile surface texture characterisation method including at least the following steps is also offered:
- measuring at least one force perceived by a force sensor during a relative movement of the said sensor with respect to a surface to be characterised,
- calculating one or more time and/or frequency parameters of an output signal transmitted by the said sensor representative of the previously measured force,
- determining at least one value of at least one tactile descriptor of multiple tactile descriptors through application of a transfer function to the previously calculated parameters, where the transfer function is previously determined by regression from a learning database associating values of each tactile descriptor of the set of tactile descriptors with values of one or more time and/or frequency parameters calculated from measurements made by the force sensor on test surfaces representative of values of the tactile descriptors.

The tactile surface texture characterisation method uses a force sensor, for example a triaxial force sensor, protected by a soft coating. The method may be broken down into two steps:
- learning of the calculation algorithm enabling the tactile characteristics of a surface to be estimated by means of signals originating from the exploration of a samples database, the textures of which are tactilely pre-characterised, i.e. the tactile properties of which are known in advance, in order to construct a continuous transfer function,
- use of the trained calculation algorithm, i.e. of the transfer function, to deduce therefrom the characteristics of a new texture.

Thus, with the method of characterisation according to the invention, a method is therefore obtained enabling any type of surface to be characterised and which, by means of the continuous transfer function determined by the method, enables a "continuous" characterisation to be accomplished of various characteristics of the surfaces by one or more values associated with one or more of the different tactile descriptors, i.e. of the tactile descriptor values. A value of a tactile descriptor is therefore determined through a continuous transfer function, therefore defining an interval of values of the tactile descriptor relative to an interval of values of one or more parameters representative of the force measured by the force sensor.

This method enables optimal approximation to human tactile assessment, unlike the methods of the prior art, which determine that an analysed surface necessarily belongs only to a single category of surface, and/or use discrete values to characterise a surface. The invention therefore provides substantially improved accuracy in characterising the surface considered, bearing in mind that the use of a continuous function potentially provides an unlimited set of values for each descriptor.

The invention therefore enables a level of a tactile descriptor to be determined on a continuous scale, unlike the methods of the prior art, which make a discrete classification of a sample between several possible descriptors.

The tactile characteristic to be assessed may be defined by means of one or more mechanical descriptors, or tactile descriptors, of a touch sensation, where each of these descriptors includes a range of values which may equate to a range of values of one or more parameters of a signal representative of this surface calculated during the method.

Such a method notably has the advantage that it is able to be used by a measuring system of low encumbrance, and which is potentially inexpensive. It is notably possible to use existing tactile descriptors, for example those provided by a particular application.

The method notably enables a surface to be characterised by the values of several tactile descriptors, for example by moving the sensor tangentially and in a manner normal relative to the surface, which notably enables the roughness of the surface, and also the hardness or again the liveliness of this surface, to be defined. Each tactile descriptor is therefore linked to a continuous transfer function enabling the surface to be characterised optimally.

Since the sensor can form part of a gripper device, the invention may enable non-flat surfaces to be characterised, independently of the thickness of the characterised object (for example: skin, fabrics, the interior of a car).

The method according to the invention also enables fluids to be characterised by moving it on the surface of these fluids, or in them, providing the sensor and its electrical connectors have been hermetically conditioned, for example for food products (e.g.: measurement of the smoothness of a yoghurt) or cosmetics products (e.g.: evaluation of the texture of a cream).

The learning database may be obtained through implementation, for each tactile descriptor, of the following steps:
  measuring at least one force perceived by the force sensor during relative movements of the said sensor with respect to several different surfaces representing several values of the tactile descriptor,
  calculating several time and/or frequency parameters of the output signals transmitted by the said sensor representative of the previously measured force,
  generating the learning database by listing for each of the output signals transmitted by the said sensor the values of the previously calculated parameters, and by associating them with the values of the tactile descriptor.

The transfer function may be determined from some of the time and/or frequency parameters of the learning database which have been previously selected from all the time and/or frequency parameters of the learning database.

The time and/or frequency parameters may be selected through the implementation of a Gram-Schmidt algorithm.

The transfer function may be calculated by a linear regression by the method of least squares, or through the application of a neural network model of the multi-layer perceptron type.

The force measured by the sensor may be a tangential force, or a parallel shearing force, with the relative movement of the sensor with respect to the surface.

The output signal transmitted by the said force sensor may be a voltage proportional to the force measured by the sensor, which is sampled and digitised prior to calculating the time and/or frequency parameters.

The time parameter or parameters of the signal may be chosen from among an average, a standard deviation, a moment of a given kind, or a gradient at the origin of the signal, where the frequency parameter or parameters of the signal may be chosen from among a gradient, an average or the determination of spectral lines or patterns of certain frequency bands of the signal's spectrum.

The relative movement of the force sensor with respect to the surface to be characterised may be made by automated means for moving the force sensor over the surface and/or for moving the surface relative to the force sensor.

The force sensor may be a triaxial force sensor, where the output signal transmitted by the force sensor can include three components, each of which corresponding to a measurement of forces in one dimension, i.e. along the axes of orthonormed marker.

The force sensor may include at least one deformable membrane, and one rod connected mechanically to the deformable membrane and positioned at least partly within a coating structure.

The force sensor may be positioned at one end of a gripper body of a device for tactile surface texture characterisation.

BRIEF DESCRIPTION OF THE ILLUSTRATIONS

Figure 2:
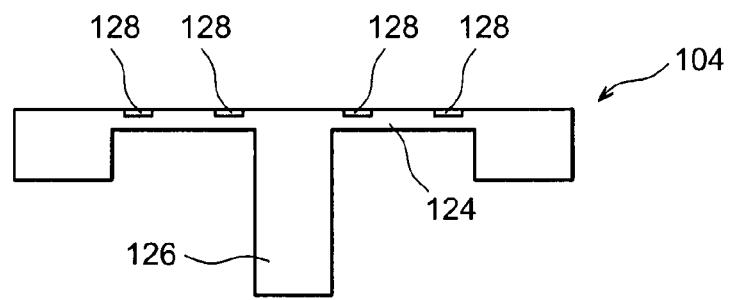
Figure 3:
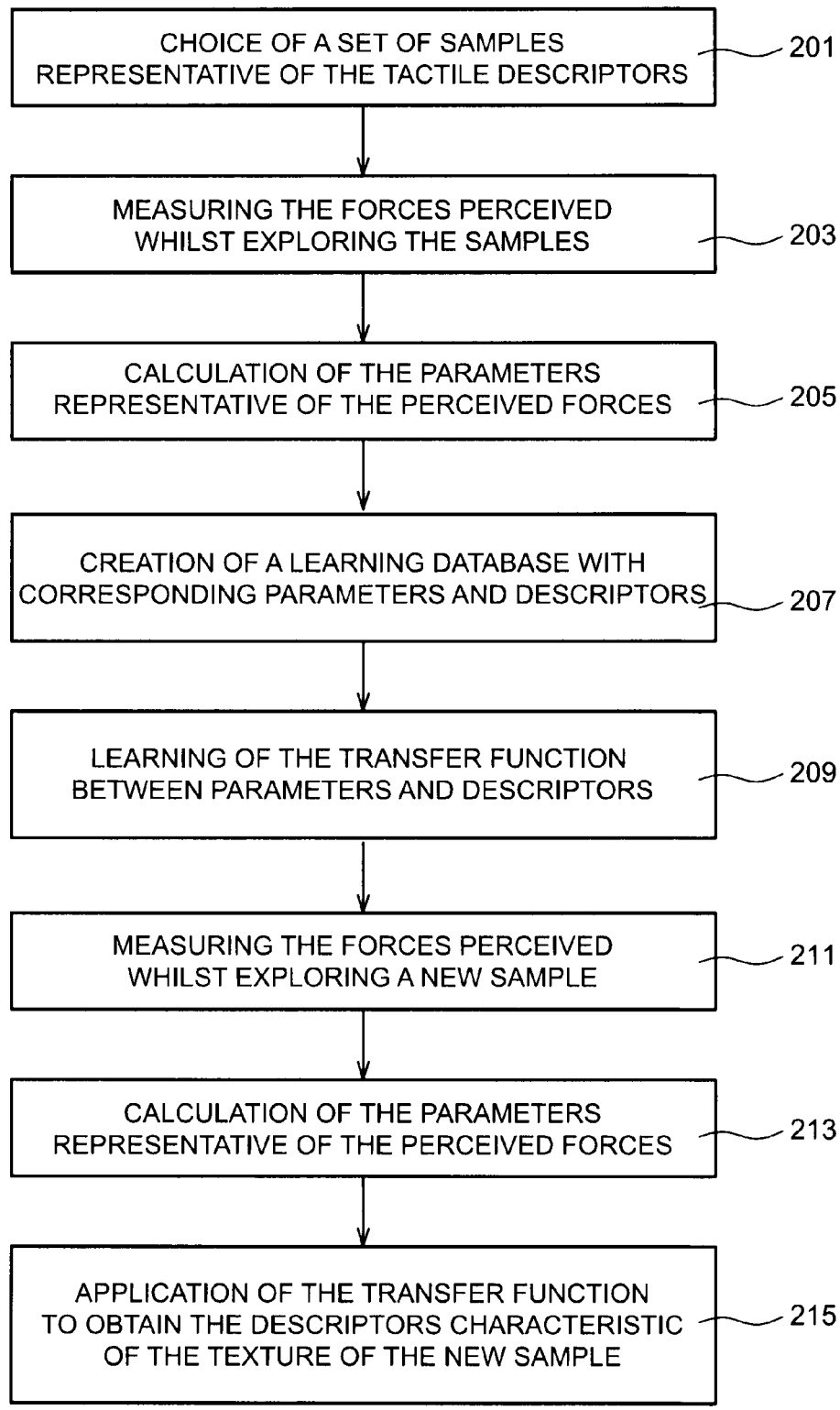

The present invention will be better understood on reading the description of examples of embodiment given, purely as an indication and in no way limiting, making reference to the appended illustrations in which:

FIG. 1 represents a device for tactile surface texture characterisation used in a method for tactile surface texture characterisation, forming the subject of the present invention, according to a particular embodiment, FIG. 2 represents a triaxial sensor of a device for tactile surface texture characterisation used during a method for tactile surface texture characterisation, forming the subject of the present invention, according to a particular embodiment, FIG. 3 represents, in the form of a block diagram, the steps of a method for tactile surface texture characterisation, forming the subject of the present dimension, according to a particular embodiment.

Identical, similar or equivalent parts of the different figures described below bear the same numerical references, to facilitate moving from one figure to another.

The various parts represented in the figures are not necessarily represented with a uniform scale, in order to make the figures more readable.

The various possibilities (variants and embodiments) must be understood as not being mutually exclusive, and able to be combined with one another.

DETAILED ACCOUNT OF PARTICULAR EMBODIMENTS

Reference is made firstly to FIG. 1, which represents a device for tactile surface texture characterisation 100, used during a method for tactile surface texture characterisation according to a particular embodiment, the various steps of which are represented in the block diagram of FIG. 3, and are described below in detailed fashion.

Device 100 is, here, an artificial finger, and includes a gripper body 102. Device 100 includes a triaxial force sensor 104, for example of the MEMS type and composed of silicon. Sensor 104, represented in detailed fashion in FIG. 2, includes a deformable membrane 124 and a rod, or shaft, 126 mechanically connected to the centre of the deformable membrane 124 and buried in a coating structure 108 covering sensor 104. The deformation of membrane 124 by rod 126, when this rod 126 is subjected to a force, is measured by transduction means 128, such as piezo-resistive strain gauges or capacitance variation detectors, positioned on membrane 124. In this embodiment, sensor 104 is recessed in one face of a flat support 106 composed of a hard material, for example epoxy.

The method also uses means to move device 100 over the surface to be studied. These means enable device 100 to be applied to the surface to be analysed using a certain normal force and the tangential movement (in one or two dimensions) of the sensor over the surface to be characterised.

To simplify the interpretation of the signals during this movement, the normal force may be kept constant. It can be thus maintained by means of a spring which then enables the topological variations of the explored surface to be cushioned. As a variant, it is also possible that these means may produce a movement of the surface to be characterised relative to device 100.

The nature of the relative movement of device 100, and more specifically of sensor 104, with respect to the surface to be characterised, depends on the nature of the tactile characteristics which it is sought to estimate. For example, if it is sought to characterise the topological variations of the analysed surface, a movement of the sensor in the plane of the studied surface is then made, against the surface, in order to measure at least the tangential force received by the sensor during this movement. Measurements may also be made by moving the sensor in the direction normal to the surface. It is thus possible to evaluate properties such as hardness and liveliness of a material.

These means of relative movement of device 100 with respect to the surface to be characterised may also be provided by a person, where device 100 is moved by hand over the surface. This variant is particularly advantageous if the surface to be analysed is not flat, such as, for example, during an analysis of the skin of the face.

When the sensor is subjected to a contact force the sensor transmits a signal in the form of a voltage which is then processed by means of an electronic processing unit, thus providing a voltage in proportion to the measured force. This voltage is then sampled, digitised and recorded by means of an acquisition adapter, for example. A time signal is obtained $s(t)=\{s(t0), \ldots, s(ti), \ldots, s(tn)\}$, consisting in this case of n samples. Depending on the type of measurement made (tangential and/or normal movement of the sensor relative to the surface to be characterised), the time signal $s(t)$ may consist of one, two or three components $(s_X, s_Y, s_Z)$, each representing the measurement of the sensor in one direction, i.e. along an axis of an orthogonal marker. Thus, using these three components, it is possible to make an evaluation of the desired tactical characteristics of the surface: for example, components $s_X$ and $s_Y$ (components in the plane of the analysed surface, corresponding to the measurement of the tangential force received in the sensor) may be used to measure the roughness of the surface, whereas component $s_Z$ (the component normal to the plane of the analysed surface, corresponding to the measurement of the normal force received in the sensor) may be used to measure the liveliness or hardness of the material of the surface to be characterised.

In the method for tactile surface texture characterisation implemented here, it is sought to characterise the texture of the surface by a quantification of a tactile sensation equivalent to the one felt by a subject exploring the surface with their finger. The method uses several mechanical descriptors, or tactile descriptors, which designate a tactile characteristic (limp, rough, soft, coarse, etc.). The method which is implemented here allows, depending on the values of the measurements made by the sensor, the values to be determined of one or more tactile descriptors which are optimal in order to describe the analysed surface.

The tactile surface texture characterisation method firstly includes a learning phase. For each tactile descriptor, several surface samples having different values, which are representative of the scale of the tactile descriptor, are chosen (step 201). For example, it is possible to use previously graduated samples used for psychophysical tests. The tactile descriptors used to obtain the learning database are, for example, those of a tactile reference system including the following tactile descriptors:

for movements orthogonal to the surface: liveliness, stickiness, hardness, memory effect, for movements tangential to the surface: blocking, embossment, fibrous, rough, slippery.

Thus, for each tactile descriptor noted $d_e$ it is possible to use E samples, where each of these samples is associated with a value of descriptor $d_e$, where e is between 1 and E, and where E is an integer greater than or equal to 2.

For each of the E samples, device 100 acquires a signal representative of the tangential force and/or of the normal force received by the sensor during a movement of device 100 over this sample (step 203). To accomplish this, one or more movements, for example P movements (where P is an integer greater than or equal to 1), of device 100 are made over each sample. In order to avoid the effect of wear and tear caused to the coating, if there are several movements, these P movements will not be made over each sample one after another (P movements over the first sample, followed by P movements over the second sample, etc.). A first movement is preferably made over each sample, followed by a second movement over each sample, etc. In a variant, it is also possible to make the order of movement of the sensor over each of the samples random.

By this means, for each tactile descriptor, A (A=P×E) time signals $s_a=\{s_a(t0), \ldots, s_a(tn)\}$ are obtained, each comprising n samples, where a is between 1 and A. Each signal obtained is representative of the sample used for its acquisition. In other words, for each signal obtained a sample number e and a tactile descriptor $d_e$ are associated with it.

For each of the time signals obtained, several predefined parameters of these signals are calculated, where each parameter reflects the time or frequency variation of the signal over a given period of measurement (step 205). The parameters reflecting the time behaviour may be, for example, the different moments of this signal (average, standard deviation, etc., moment of order N), the gradient at the origin, or any other suitable parameter. The spectral parameters reflecting the frequency behaviour may be, for example, the gradient of the spectrum in dB, the average of the spectrum in dB, or again the determination of the spectral lines or patterns of certain frequency bands (resonances).

A set of parameters $p_a$ is associated with each signal $s_a$ which set is therefore a vector, the size of which matches the number of parameters calculated for each signal.

A learning database is then generated, listing for each sample the values of the calculated parameters, and the known corresponding ratings of the tactile descriptors (step 207). This learning database consists of all the parameters $p_a$ associated with their tactile descriptors, for each signal.

The relevant parameters are then selected, and a transfer function is determined, whereby the values of the tactical descriptors can be associated with the parameters values (step 209).

One method of selection of the relevant parameters is, for example, application of the Gram-Schmidt algorithm. This algorithm consists in selecting the parameters which correlate best with the estimated tactile descriptor.

To facilitate an understanding of it, the following naming convention will apply:
- X: the matrix of the values of the parameters (taken from the samples of the learning database), of size equal to M×N, where M is the number of observations and N the number of parameters,
- y is the vector of the M corresponding values of the tactile descriptor.

Since this algorithm is recursive, the ordinary values of X and y are called respectively $X_t$ and $y_t$. The different steps of this process are described below:

1. $X_t$=X and $y_t$=y
2. Estimate of the correlation between the N vectors $x_{t,i}$ of $X_t$ and $y_t$:

$$\sigma_i = \frac{\langle \vec{y_t}, \vec{x_{t,i}} \rangle}{\|\overrightarrow{x_{t,i}}\| \cdot \|\overrightarrow{y_t}\|}$$

where $\langle \vec{y_t}, \vec{x_{t,i}} \rangle$ represents the scalar product between $x_{t,i}$ and $y_t$ and $\|\ \|$ the norm of the variable in question.

3. Selection of a parameter c having the maximum correlation with the descriptor.
4. Projection of the parameters and of the descriptor in the space orthogonal to the chosen parameter:

$$X_t = X_t - \frac{x_{t,c}}{\|x_{t,c}\|} \cdot \langle x_{t,c}, X_t \rangle \text{ and } y_t = y_t - \frac{x_{t,c}}{\|x_{t,c}\|} \cdot \langle x_{t,c}, y_t \rangle.$$

In this space, chosen parameter c therefore has a zero value: $x_{t,c}$=0.

5. Steps 2 to 4 are repeated until a required minimum correlation value is attained, or until a maximum number Nc of selected parameters is attained.

A selection of the parameters most correlated to the descriptor is then obtained. The term given to $X_c$ is the matrix M×$N_c$ of the $N_c$ chosen parameters.

To calculate the transfer function between the selected parameters and the estimated descriptor, a linear regression algorithm by the method of least squares may be applied. This algorithm consists in evaluating the optimum parameters of a linear model of type y=Z·β+ϵ, where Z=[$X_c$ 1] (of dimension M×($N_c$+1)), β is the vector of dimension ($N_c$+1)×1 of the parameters of the linear model, and ϵ is the deviation from the model. The goal of the algorithm of least squares consists in minimising the sum of the quadratic equations for each observation. This sum is given by the following equation:

$$\chi^2(\beta) = \frac{1}{M}\sum_{i=1}^{M}(y_i - z_i \cdot \beta)^2$$

The solution to this problem may be written as follows:

$$\beta=(Z^T Z)^{-1} Z^T y$$

In the case of non-linear models (polynomial models, or neural network models of the multi-layer perceptron type), the parameters may also be found by seeking the minimum of the average quadratic error.

In one variant, a validation method may be used, keeping a part of the learning database for actual learning, and the other part for verification of the predictive power of this system.

After having implemented this learning phase the surface which it is sought to analyse can be the tangential and/or normal force received by the force sensor during a movement of the sensor over the surface to be characterised is therefore made (step 211).

One or more time and/or frequency parameters of the sensor's output signals are then calculated (step 213). Using this parameter or these parameters, it is therefore possible to determine the value of at least one tactile descriptor of the said surface to be characterised by application of the transfer function in relation to the previously calculated parameter or parameters (step 215). The tactile descriptor or descriptors for the surface to be characterised are then obtained.

The invention claimed is:

1. A tactile surface texture characterization method comprising:
   measuring at least one force perceived by a force sensor during a relative movement of the sensor with respect to a surface to be characterized;
   calculating one or more time and/or frequency parameters of an output signal transmitted by the sensor representative of the previously measured force; and
   determining a value of a tactile descriptor of multiple tactile descriptors through application of a continuous transfer function to the previously calculated parameters, wherein the transfer function is previously determined by regression from a learning database associating, for each descriptor, plural values of the tactile descriptor with plural values of one or more time and/or frequency parameters calculated from measurements made by the force sensor on multiple test surfaces representative of values of the tactile descriptor in question.

2. The method according to claim 1, in which the learning database is obtained through implementation, for each tactile descriptor, of:
   measuring at least one force perceived by the force sensor during relative movements of the sensor with respect to plural different surfaces representing plural values of the tactile descriptor;
   calculating plural time and/or frequency parameters of the output signals transmitted by the sensor representative of the previously measured force; and
   generating the learning database by listing for each of the output signals transmitted by the sensor the values of the previously calculated parameters, and by associating them with the values of the tactile descriptor.

3. The method according to claim 2, in which the transfer function is determined from some of the time and/or frequency parameters of the learning database that have been previously selected from all the time and/or frequency parameters of the learning database.

4. The method according to claim 3, in which the time and/or frequency parameters are selected through implementation of a Gram-Schmidt algorithm.

5. The method according to claim 1, in which the transfer function is calculated by a linear regression by a method of least squares, or through application of a neural network model of multi-layer perceptron type.

6. The method according to claim 1, in which the force measured by the sensor is a force tangential to relative movement of the force sensor with respect to the surface.

7. The method according to claim 1, in which the output signal transmitted by the force sensor is a voltage proportional to the force measured by the sensor, which is sampled and digitized prior to calculating the time and/or frequency parameters.

8. The method according to claim 1, in which the time parameter or parameters of the signal are chosen from among an average, a standard deviation, a moment of a given kind, or a gradient at an origin of the signal, wherein the frequency parameter or parameters of the signal are chosen from among a gradient, an average or determination of spectral lines, or patterns of certain frequency bands of the signal's spectrum.

9. The method according to claim 1, in which relative movement of the force sensor with respect to the surface to be characterized is made by automated means for moving the force sensor over the surface and/or for moving the surface relative to the force sensor.

10. The method according to claim 1, in which the force sensor is a triaxial force sensor, and wherein the output signal transmitted by the force sensor includes three components, each one of which is a measurement of forces in one dimension.

11. The method according to claim 1, in which the force sensor includes at least one deformable membrane and one rod connected mechanically to the deformable membrane and at least partly positioned in a coating structure.

12. The method according to claim 1, in which the force sensor is positioned at one end of a gripper body of a device for tactile surface texture characterization.

* * * * *